Figure 1:
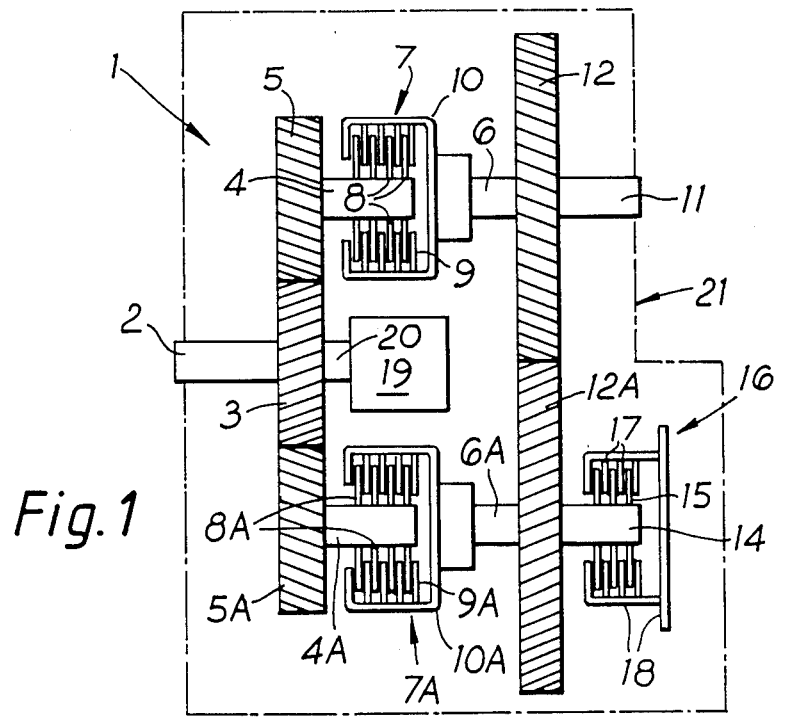

United States Patent

Bower

[11] Patent Number: 4,805,473
[45] Date of Patent: Feb. 21, 1989

[54] BI-DIRECTIONAL TORQUE TRANSMISSION UNIT

[75] Inventor: Lewis R. B. Bower, Skelmanthorpe, England

[73] Assignee: Fletcher Sutcliffe Wild Limited, Horbury Wakefield, England

[21] Appl. No.: 72,891

[22] Filed: Jul. 14, 1987

[30] Foreign Application Priority Data

Jul. 23, 1986 [GB] United Kingdom ............... 8618020

[51] Int. Cl.⁴ ..................... F16H 3/14; F16H 3/08
[52] U.S. Cl. ........................... 74/361; 74/331; 192/4 C
[58] Field of Search ............. 74/322, 331, 333, 355, 74/361, 377, 655; 192/8 R, 4 C

[56] References Cited

U.S. PATENT DOCUMENTS

| | | | |
|---|---|---|---|
| 870,202 | 11/1907 | Sponsel | 74/361 |
| 1,248,735 | 12/1917 | Sitney | 74/361 |
| 1,722,302 | 7/1929 | Lamb | 74/361 |
| 2,640,572 | 6/1953 | O'Brien | 74/731 |
| 2,719,440 | 10/1955 | Banker | 74/731 |
| 2,736,407 | 2/1956 | Smirl | 74/732 |
| 2,973,845 | 3/1961 | Sinclair | 74/361 X |
| 3,163,270 | 12/1964 | Zingsheim | 74/732 |
| 3,182,775 | 5/1965 | Schall | 192/326 |
| 3,202,018 | 8/1965 | Hilpert | 74/732 |
| 3,447,397 | 6/1969 | Black et al. | 74/732 |
| 3,593,596 | 7/1971 | Race et al. | 74/331 X |
| 3,888,337 | 6/1975 | Worthen | 192/4 C |
| 4,132,132 | 1/1979 | Shaffer | 74/732 |
| 4,138,006 | 2/1979 | Benson, Jr. | 74/377 X |
| 4,191,072 | 3/1980 | Ehrlinger et al. | 74/732 |
| 4,451,238 | 5/1984 | Arnold | 192/4 C X |
| 4,548,101 | 10/1985 | Akashi et al. | 74/730 |
| 4,574,925 | 3/1986 | Nishimura et al. | 74/732 |

Primary Examiner—Dirk Wright
Attorney, Agent, or Firm—Trexler, Bushnell, Giangiorgi & Blackstone

[57] ABSTRACT

A bi-directional torque transmission unit (1) comprises an input shaft (2) connectable to a prime mover and provided with an input drive gear wheel (3), first and second driven shafts (4, 4A) each having a driven gear (5, 5A) constantly in mesh with the input drive gear wheel (3), so that they are rotatable in the same direction, a hydraulically actuated and modulated clutch (7, 7A) interconnecting each driven shaft (4) with an intermediate, output shaft (6, 6A) and a final, output shaft (11) connectable to a load, and both the first and the second output shafts (6, 6A) having an output gear (12, 12A) whereby selective or simultaneous engagement of one or other of the modulated clutches (7, 7A) transmits torque to the final output shaft (11).

11 Claims, 2 Drawing Sheets

BI-DIRECTIONAL TORQUE TRANSMISSION UNIT

This invention relates to a bi-directional torque transmission unit, suitable for instance for a mining machine haulage, a belt-conveyor, a scraper chain conveyor, a ropehauled railway system etc., with the transmission interposed between a prime mover, e.g. an electric motor and an element connected to a load to be driven (or to be retarded), and the element could take the form of a drive chain, whether endless or not, a drive sprocket, a drive roller etc. By the expression "bi-directional" is meant a transmission unit that is capable of satisfactory operation, at full power, in both forward and reverse directions.

The object of the present invention is to provide an improved torque transmission unit of simplified construction, and readily adaptable to a variety of different operational requirements, having accurate speed control in both forward and reverse directions.

According to a first aspect of the present invention, there is provided a bi-directional torque transmission unit comprising:

(a) an input shaft connectable to a prime mover and provided with an input drive gear wheel;

(b) first and second driven shafts, each having a driven gear wheel constantly in direct or indirect mesh with the input drive gear wheel, such that the first and second driven shafts are rotatable only in the same direction;

(c) first and second intermediate output shafts, geared together and, in their respective drive modes, rotatable in the same direction;

(d) first and second hydraulically actuated and modulated clutches interconnecting the first and second driven shafts, respectively, with the first and second intermediate output shafts, with the clutches engageable selectively; and (e) a final output shaft in drivable relationship with both the first and second intermediate output shafts, with the clutch selected for engagement determining the direction of rotation of the final output shaft.

According to a second aspect of the present invention, there is provided a bi-directional torque transmission unit comprising:

(a) an input shaft connectable to a prime mover and provided with an input drive gear wheel;

(b) first and second driven shafts, each having a driven gear wheel constantly in direct or indirect mesh with the input drive gear wheel, such that the first and second shafts are rotatable only in the same direction;

(c) first and second intermediate output shafts, geared together and, in their respective drive modes, rotatable in the same direction;

(d) first and second hydraulically actuated and modulated clutches interconnecting the first and second driven shafts, respectively, with the first and second intermediate output shafts, with the clutches engageable simultaneously;

(e) a final output shaft in drivable relationship with both the first and second intermediate output shafts; and (f) selectively operable gearing means to determine the direction of rotation of the final output shaft.

By the expression "hydraulically actuated and modulated clutch" is meant a clutch of the known kind designed for constant duty slip.

If a retarding facility is required for the unit in accordance with the first aspect, this may readily be provided by engagement, to a degree dependent upon the load and the retarding effect required, of the non-driving clutch.

If clutch heat dissipation should present a problem a hazard and/or if higher torque is/are required to be transmitted, then in accordance with an enhanced version of the torque transmission unit, a torque converter is interposed between each clutch and its intermediate output shaft. In detail, a rotatable, housing portion of each clutch would be drivably connected to a rotatable, drive portion of its torque converter, while each intermediate output shaft would be drivably connected to a rotatably driven portion of its torque converter.

It is a fact that some torque converters are not efficient in the reverse direction, and consequently a lock-up clutch is preferably provided on both torque converters, the lock-up clutch, of the driving torque converter, being engaged in the upper speed range, and the lock-up clutch of the non-driving torque converter being engaged at all times, to ensure that any retardation is effected only by the modulated clutch of the non-driving torque converter. With torque converters having lock-up clutches, then upon engagement of the non-driving clutch to provide a regenerative retarding effect, the lock-up clutch of the associated torque converter is also engaged. If on the other hand some other type torque converter is used, which is efficient in the reverse direction e.g. a "stationary housing" type, then the lock-up clutch would be used to lock-out the modulated clutch.

In its simplest form, the "input" side of the torque transmission unit, in a direct mesh embodiment, would comprise three gear wheels. Preferably, spur gear wheels are employed, whereby the input shaft and the two driven shafts would all be rotatable about parallel axes. Similarly, the "output" side of the torque transmission unit, in a direct mesh embodiment, would comprise two gear wheels, again preferably spur gear wheels, so that the two output shafts are also rotatable about axes parallel to one another, and conveniently parallel to the axes of the "input" side shafts.

With an indirect mesh embodiment the "input" side would comprise additional (spur) gear wheels, and the "output" side additional (spur) gear wheels.

Although the three (or additional) "input" gear wheels could have the same number of teeth, they could if required produce a gear ratio e.g., a 1500 r.p.m. input could be arranged to produce a 2000 r.p.m. output.

It is also preferred for the second intermediate output shaft to be provided with a torque responsive holding brake, preferably of a multi-disc, spring-on, hydraulic-off type.

Conveniently, a hydraulic pump for providing pressure fluid at least for clutch modulation, is drivable by an extension shaft of the input shaft, beyond the input drive gear wheel.

It is also preferred for a speed sensor to be associated with the final output shaft, as part of a control system for the torque transmission unit, which system also preferably has facilities for programmable controlled variable speed zero-100% in drive (or if also required regeneration); torque and/or power limiting to keep drive within safe working limits; complete auto/manual remote control with voltage—current or digital response; radio control; (for coal mines) MINOS/SAP link compatibility; a mid-speed set point; upper and lower speed limits; (for coal mines) an intrinsically safe monitor and control unit, and simple hydraulic manual controls for full power forward/reverse operation (without regeneration for scraper chain conveyors), and with torque converter options.

Figure 2:
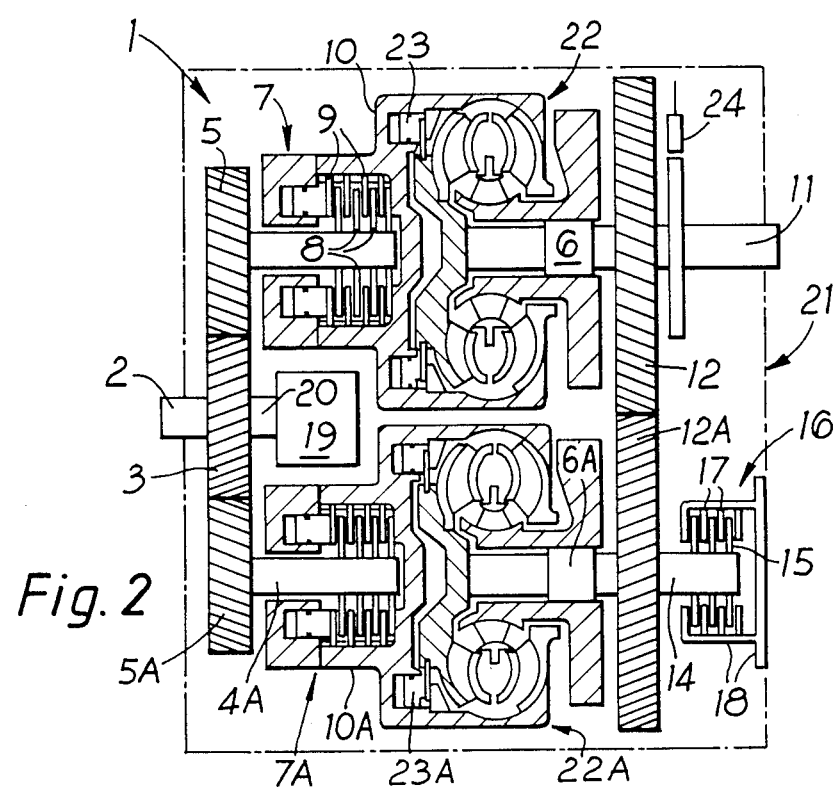
Figure 3:
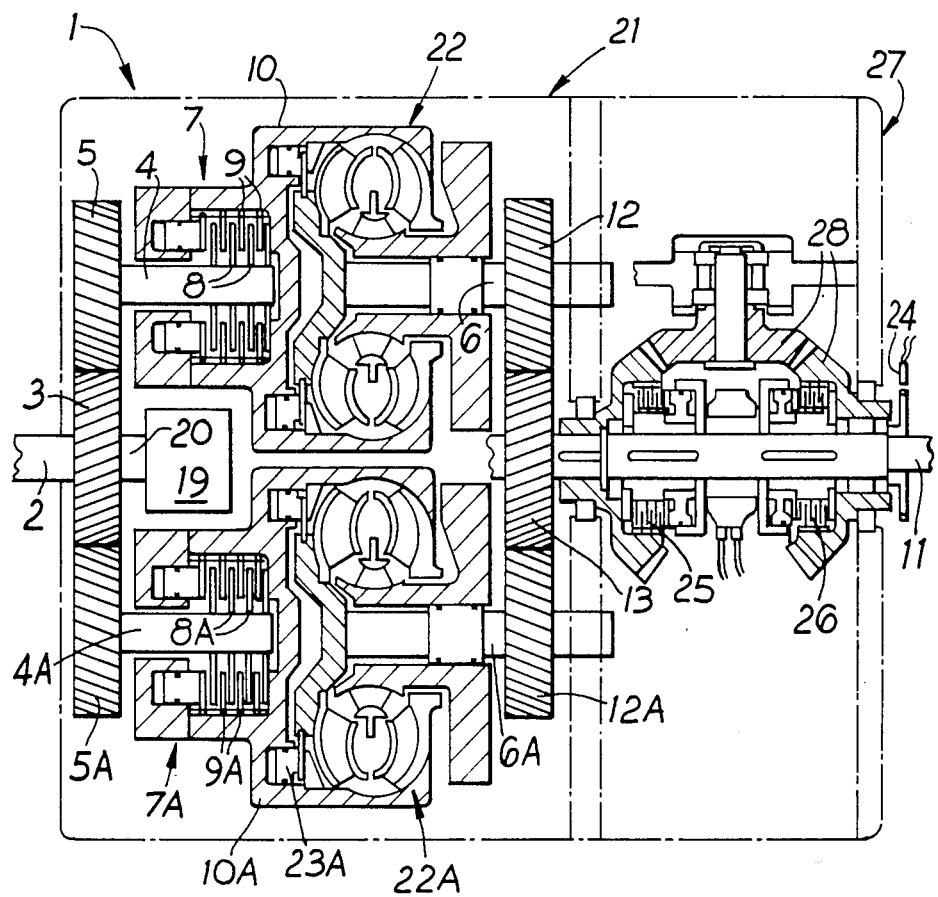

The invention will now be described in greater detail, by way of examples, with reference to the accompanying drawings in which:

FIGS. 1, 2 and 3 show diagrammatically a first, second and third embodiment respectively of torque transmission units in accordance with the invention.

In all Figures, like components are accorded like reference numerals.

A bi-directional torque transmission unit 1, e.g. of a mine conveyor, is illustrated, comprising an input shaft 2 connectable to a prime mover (not shown) such as an electric motor, and provided with an input drive gear wheel 3. First and second driven shafts 4, 4A each have a driven gear wheel 5, 5A constantly in direct mesh with the input drive gear wheel 3, whereby when the electric motor is switched on, the driven shafts 4, 4A are both rotated in the same direction, which direction is opposite to that of the input shaft 2. First and second intermediate output shafts are indicated at 6 and 6A respectively, and first and second hydraulically actuated and modulated clutches 7, 7A interconnect the first and second driven shafts 4, 4A respectively with the first and second intermediate output shafts 6, 6A. In detail, first plates 8, 8A of each clutches 7, 7A are fixed to the driven shafts 4, 4A respectively, while second plates 9, 9A of each clutch 7, 7A are interleaved with the first plate 8, 8A and are secured respectively to a housing 10, 10A secured to the first and second output shafts 6, 6A, respectively. In the embodiments of FIGS. 1 and 2, a final output shaft 11 is provided by a shaft extension of the first intermediate output shaft 6, the final output shaft 11 being connected to a load to be driven, such as a sprocket barrel of a scraper chain conveyor. Furthermore, both the first and second output shafts 6, 6A each have an output gear wheel 12, 12A. In the embodiments of FIGS. 1 and 2, the gear wheels 12, 12A are in direct mesh with one another and hence rotatable in opposite directions, while in the embodiment of FIG. 3 the gear wheels 12 and 12A are in indirect mesh, with an idler gear wheel 13 interposed, and are thereby rotatable in the same direction. Also in the embodiment of FIG. 3, the final output shaft 11 is constituted by a lay shaft on which the idler gear wheel 13 is mounted.

In the embodiments of FIGS. 1 and 2, the second, intermediate output shaft 6A has a shaft extension 14 to which is fixed first elements 15 of a "spring-on", "hydraulic-off" torque responsive brake 16, while second, static elements 17 are secured to a housing 18 of the brake 16, which housing is fixed. Hydraulic pressure fluid to activate the clutches 7, 7A and brake 16 is provided by a pump 19 driven by a shaft extension 20 of the input shaft 2, whilst all the elements 2–20 are housed within a rigid casing indicated diagrammatically at 21.

In the embodiment of FIGS. 2 and 3, a torque converter 22, 22A is interposed between each clutch 7, 7A and the first and second intermediate output shafts 6, 6A, with each torque converter 22, 22A having an hydraulically operable, lock-up clutch 23, 23A. Also illustrated in FIGS. 2 and 3 is a speed sensor 24.

In all three embodiments, and with the prime mover running, no torque transmission is effected by the unit 1 while the clutches 7, 7A are dis-engaged.

In the embodiments of FIGS. 1 and 2, when driving torque is required to be transmitted, one or other clutch 7, 7A, i.e. the "driving" clutch, is selected for engagement, (e.g. by local or remote operation of suitable hydraulic control valves) the selection depending on the direction of rotation required for the final output shaft 11.

If the load is such that it could be certain circumstances "drive" the motor, e.g. if the load is a belt conveyor with a downhill section, then the "non-driving" clutch could be engaged to give a braking effect, the degree of engagement being in accordance with the braking effort required.

As the ability of the clutches 7, 7A and other elements to transmit torque is finite, then the embodiments of FIG. 3 indicates that when both clutches 7, 7A are engaged simultaneously, both intermediate output shafts 6, 6A are rotatable in the same direction and through the gear wheels 12, 12A and 13, both apply torque to the final output shaft 11. Hence the embodiment of FIG. 3 is capable of use with a prime mover of twice the capacity of the FIG. 1 and 2 embodiments. The direction of rotation of the output shaft 11 is determined by selective actuation of clutch 25 or 26 of an add-on reversing box 27 provided with appropriate bevel gears 28. To attain reversability, one or other clutches 25 or 26, which may be hydraulically operable, are selected for engagement, again by local or remote controls.

What I claim is

1. A bi-directional torque transmission unit comprising an input shaft connectable to a prime mover, an input drive gear wheel provided on said input shaft, first and second driven shafts, a driven gear wheel provided on said first and second driven shafts, said driven gear wheels being in mesh with said input drive gear wheel, such that said first and second driven shafts are rotatable only in the same direction; first and second intermediate output shafts, geared together and, in their respective drive modes, rotatable in the same direction; first and second hydraulically actuated and modulated clutches interconnecting said first and second driven shafts, respectively, with said first and second intermediate output shafts, with said clutches engageable selectively; and a final output shaft in drivable relationship with both said first and second intermediate output shafts, whichever clutch is selected for engagement determining the direction of rotation of said final output shaft, and said first and second modulated clutches being sequentially engageable for simultaneous engagement to provide regenerative retarding of the rotation of said final output shaft in either of said directions.

2. A unit as claimed in claim 1, wherein a shaft extension of said first intermediate shaft constitutes said final output shaft.

3. A unit as claimed in claim 1, wherein a torque converter is interposed between each said clutch and its intermediate output shaft.

4. A unit as claimed in claim 3, wherein a rotatable, housing portion forms part of each said clutch both a drive portion and a rotatably driven portion are provided on said torque converter associated with said clutch and said rotatable housing portion is drivably connected to said drive portion of its torque converter, while each intermediate output shaft is drivably connected to said rotatably driven portion of its torque converter.

5. A unit as claimed in claim 3, wherein a lock-up clutch is provided on both said torque converters.

6. A unit as claimed in claim 1, wherein an input side of said unit comprises three gear wheels only, being said input drive gear wheel and said driven gear wheels of said first and second driven shafts, in direct mesh.

7. A unit as claimed in claim 1 wherein an output side of said unit comprises two gear wheels only, being a gear wheel of said first intermediate output shaft in direct mesh with a gear wheel of said second intermediate output shaft.

8. A unit as claimed in claim 1, wherein a shaft extension is provided on said second intermediate output shaft, and a torque responsive holding brake is provided on said shaft extension.

9. A unit as claimed in claim 1, wherein an extension shaft is provided on said input shaft beyond said input drive gear wheel and an hydraulic pump is drivable by said extension shaft.

10. A unit as claimed in claim 1, comprising a casing inside which said components of said unit are located.

11. A unit as claimed in claim 1, wherein a speed sensor is associated with said final output shaft, as part of a control system for said torque transmission unit.

* * * * *